US012576929B2

(12) United States Patent
Stanek

(10) Patent No.: US 12,576,929 B2
(45) Date of Patent: Mar. 17, 2026

(54) ENDLESS TRACK ASSEMBLY

(71) Applicant: Shandong America Industries, Inc., Surprise, AZ (US)

(72) Inventor: Peter Daniel Stanek, Litchfield Park, AZ (US)

(73) Assignee: SHANDONG AMERICA INDUSTRIES, INC., Surprise, AZ (US)

( * ) Notice: Subject to any disclaimer, the term of this patent is extended or adjusted under 35 U.S.C. 154(b) by 400 days.

(21) Appl. No.: 18/303,013

(22) Filed: Apr. 19, 2023

(65) Prior Publication Data

US 2024/0351647 A1     Oct. 24, 2024

(51) Int. Cl.
| | |
|---|---|
| B62D 55/084 | (2006.01) |
| B62D 55/10 | (2006.01) |
| B62D 55/125 | (2006.01) |
| B62D 55/14 | (2006.01) |
| B62D 55/24 | (2006.01) |
| B62D 55/30 | (2006.01) |

(52) U.S. Cl.
CPC ........... B62D 55/084 (2013.01); B62D 55/10 (2013.01); B62D 55/125 (2013.01); B62D 55/14 (2013.01); B62D 55/244 (2013.01); B62D 55/305 (2013.01)

(58) Field of Classification Search
CPC ........ B62D 55/04; B62D 55/10; B62D 55/12; B62D 55/13; B62D 55/14; B62D 55/084; B62D 55/125; B62D 55/135; B62D 55/244; B62D 55/305; B62D 55/0847; B62D 55/0882; B62D 55/0887

USPC ......................................................... 301/125
See application file for complete search history.

(56) References Cited

U.S. PATENT DOCUMENTS

| | | | | |
|---|---|---|---|---|
| 1,258,288 | A | * | 3/1918 | Wickersham ........ B62D 55/305 |
| | | | | 305/125 |
| 2,728,611 | A | | 12/1955 | Brauss |
| 3,724,587 | A | | 4/1973 | Kasin et al. |
| 3,787,099 | A | | 1/1974 | Tucker et al. |
| 3,841,424 | A | | 10/1974 | Purcell et al. |
| 4,448,273 | A | | 5/1984 | Barbieri |
| 4,953,919 | A | | 9/1990 | Langford |
| 5,340,205 | A | | 8/1994 | Nagorcka |
| 5,954,148 | A | * | 9/1999 | Okumura ............... B62D 55/04 |
| | | | | 305/131 |
| 6,006,847 | A | | 12/1999 | Knight |
| 6,062,661 | A | * | 5/2000 | Juncker .............. B62D 49/0635 |
| | | | | 305/195 |

(Continued)

FOREIGN PATENT DOCUMENTS

WO      WO-2017093908 A1 *  6/2017   ............. B62D 55/12

OTHER PUBLICATIONS

Irrigation Leader Magazine "Reinventing the Wheel", Irrigation Leader Magazine, undated, copyright 2023.

*Primary Examiner* — S. Joseph Morano
*Assistant Examiner* — Eva L Comino
(74) *Attorney, Agent, or Firm* — Fredrikson & Byron, P.A.

(57)                ABSTRACT

An endless track assembly configured to mount to a rotating wheel drive of a vehicle. The endless track assembly has a rotatable drive sprocket for driving an endless track about a frame and idler wheels. Guide rollers mounted to the frame support and rotate with the drive sprocket and limit the movement of the drive sprocket relative to the frame.

9 Claims, 19 Drawing Sheets

(56) References Cited

U.S. PATENT DOCUMENTS

| | | | | | |
|---|---|---|---|---|---|
| 6,068,353 | A | * | 5/2000 | Juncker | B62D 55/15 |
| | | | | | 305/195 |
| 6,089,684 | A | * | 7/2000 | Bergstrom | B62D 55/0887 |
| | | | | | 404/129 |
| 7,131,508 | B2 | * | 11/2006 | Brazier | B62D 55/14 |
| | | | | | 180/9.5 |
| 7,137,675 | B1 | | 11/2006 | Simula et al. | |
| 7,597,161 | B2 | | 10/2009 | Brazier | |
| 8,297,383 | B2 | | 10/2012 | Desprs | |
| 8,474,554 | B2 | | 7/2013 | Howe et al. | |
| 10,308,296 | B2 | | 6/2019 | Piens et al. | |
| 10,358,177 | B2 | * | 7/2019 | Brazier | B62D 55/084 |
| 11,186,329 | B2 | | 11/2021 | Brazier | |
| 11,554,822 | B2 | | 1/2023 | Smith et al. | |
| 2005/0145422 | A1 | * | 7/2005 | Loegering | B62D 55/305 |
| | | | | | 180/9.26 |
| 2011/0101135 | A1 | * | 5/2011 | Korus | B62D 55/244 |
| | | | | | 305/191 |
| 2013/0113274 | A1 | * | 5/2013 | Hansen | B62D 55/14 |
| | | | | | 305/145 |
| 2015/0114730 | A1 | | 4/2015 | Gulliksson | |
| 2019/0071140 | A1 | * | 3/2019 | Buchanan | B62D 55/135 |
| 2022/0119052 | A1 | | 4/2022 | Kukuk et al. | |
| 2022/0297774 | A1 | | 9/2022 | Sheppard | |
| 2023/0044095 | A1 | | 2/2023 | Sauvageau et al. | |

* cited by examiner

ENDLESS TRACK ASSEMBLY

FIELD OF THE INVENTION

The invention is related to an endless track assembly for vehicles that move along uneven terrain.

BACKGROUND OF THE INVENTION

Certain vehicles routinely move along uneven and irregular terrain. For example, agricultural vehicles are designed to move along terrain that contain sand, mud, rocks, ice and other obstacles. Exemplary agricultural vehicles include irrigation systems, harvesters, combines and tractors.

Conventionally, agricultural vehicles have had large wheels and tires to make it easier for the vehicles to move along uneven terrain. However, tires often have poor traction on uneven terrain, making the vehicles more likely to become stuck. Further, agricultural vehicles are often heavy, which causes the tires to undesirably compact portions of the ground and thus damage valuable crops and topsoil in fields. Further, tires are prone to puncture damage from sharp objects such as rocks.

Track systems were later developed to be used in place of the wheels and tires. Track systems have helped provide an increased area of contact with the ground, which help increase traction and distribution of weight of the vehicle over the ground surface. The vehicles are less likely to get stuck and the track systems do not cause as much damage to fields. Further, track systems are more durable than tires and less susceptible to puncture damage. Finally, track systems provide smoother rides over uneven terrain.

While track systems have provided improvements over tires, there remains a need for improved track systems that provide even better traction, durability and ease of use. It is therefore desirable to provide an improved track system design over conventional track systems.

BRIEF DESCRIPTION OF THE DRAWINGS

FIG. 4 illustrates a top perspective view of a drive sprocket of an endless track assembly according to certain embodiments.

FIG. 5 illustrates a perspective sectional view of a drive sprocket engaged with an endless track of an endless track assembly according to certain embodiments.

FIG. 7 illustrates another perspective sectional view of a drive sprocket engaged with an endless track of an endless track assembly according to certain embodiments.

FIG. 17 illustrates a side cutout view of a leading idler wheel assembly engaged with a plate of a frame assembly of an endless track assembly according to certain embodiments.

DETAILED DESCRIPTION OF PREFERRED EMBODIMENTS

Figure 1:
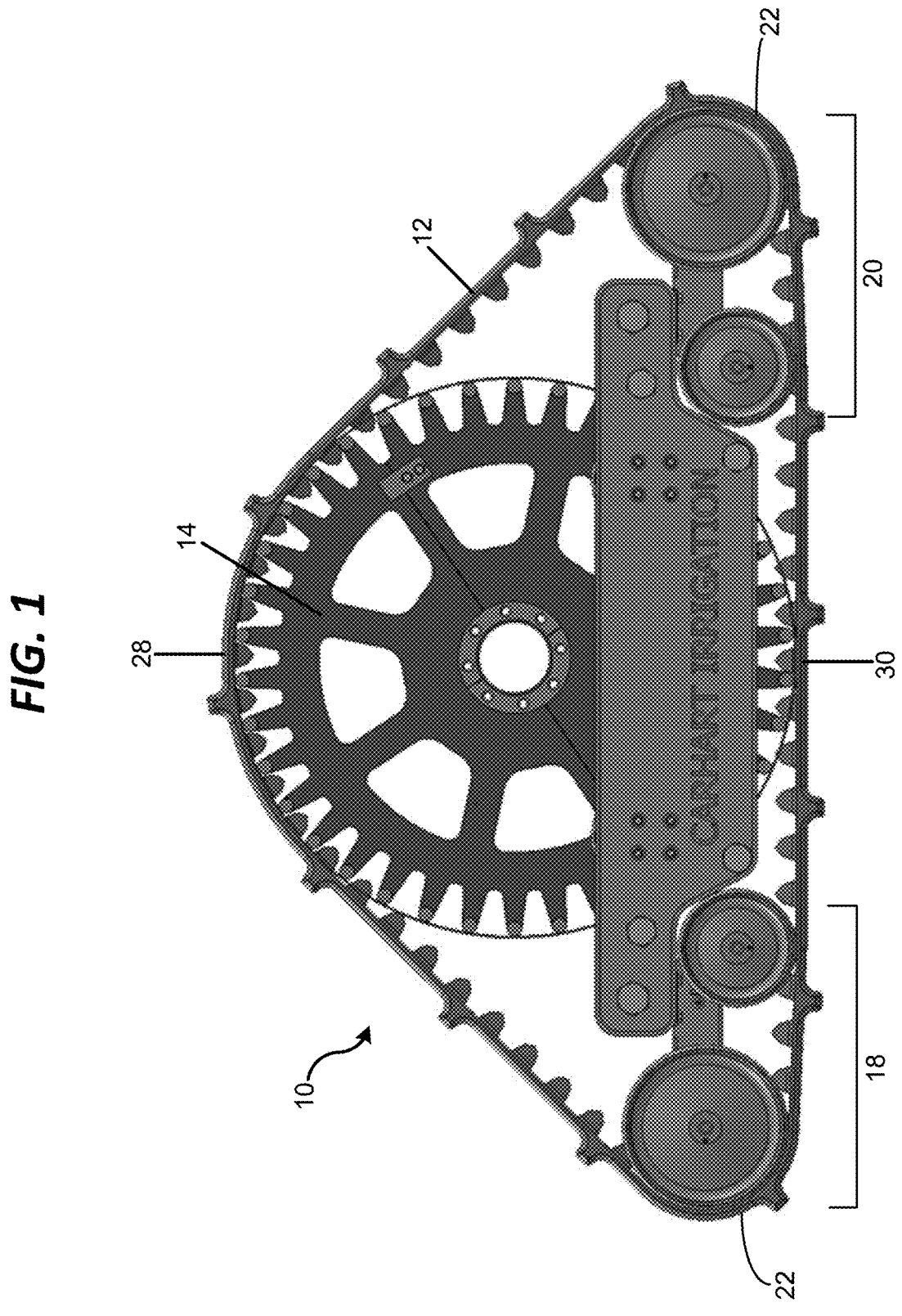
FIG. 1 illustrates a front view of an endless track assembly according to certain embodiments.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Figure 2:
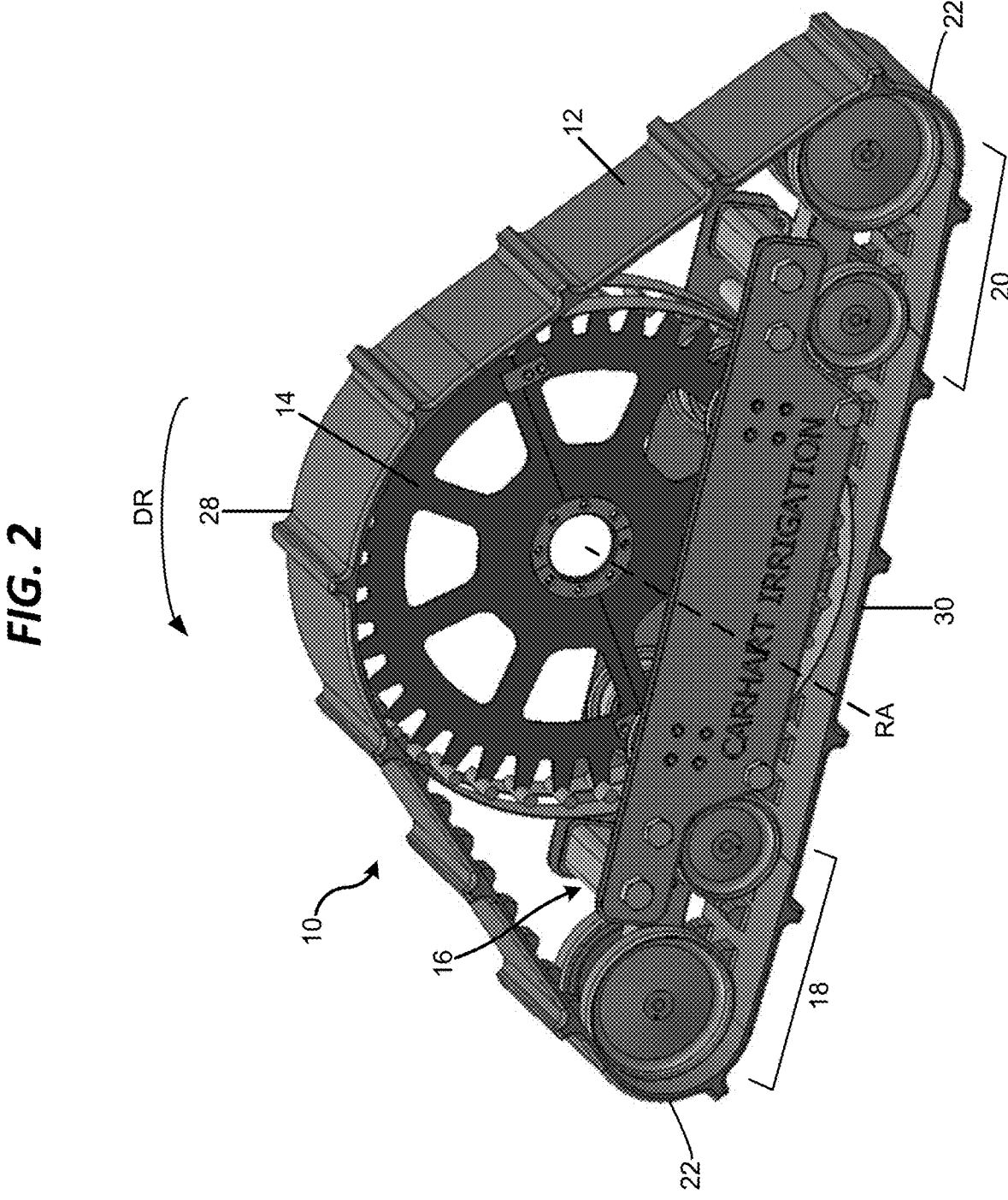
FIG. 2 illustrates a top perspective view of an endless track assembly according to certain embodiments.

The Figures illustrate an endless track assembly 10 according to certain embodiments. The endless track assembly 10 can replace any wheel of any kind of existing wheeled vehicle to convert the wheeled vehicle to a track-driven vehicle. Referring to FIGS. 1 and 2, the endless track assembly 10 is configured to mount to a rotating wheel drive (not shown) of any vehicle in a known manner. As the wheel drive rotates about the rotational axis RA in a, it effectively rotates the endless track assembly 10 and moves the vehicle along terrain. In many cases, the direction of rotation DR is a counter-clockwise direction.

The endless track assembly 10 generally includes an endless track 12, a drive sprocket 14, a frame assembly 16, a first idler wheel assembly 18 and a second idler wheel assembly 20. The endless track 12 is positioned around the drive sprocket 14, the frame assembly 16, the first idler wheel assembly 18 and the second idler wheel assembly 20. The endless track 12 also directly engages with components of the drive sprocket 14, the first idler wheel assembly 18 and the second idler wheel assembly 20. The endless track 12 is also tensioned around these components.

Figure 3:
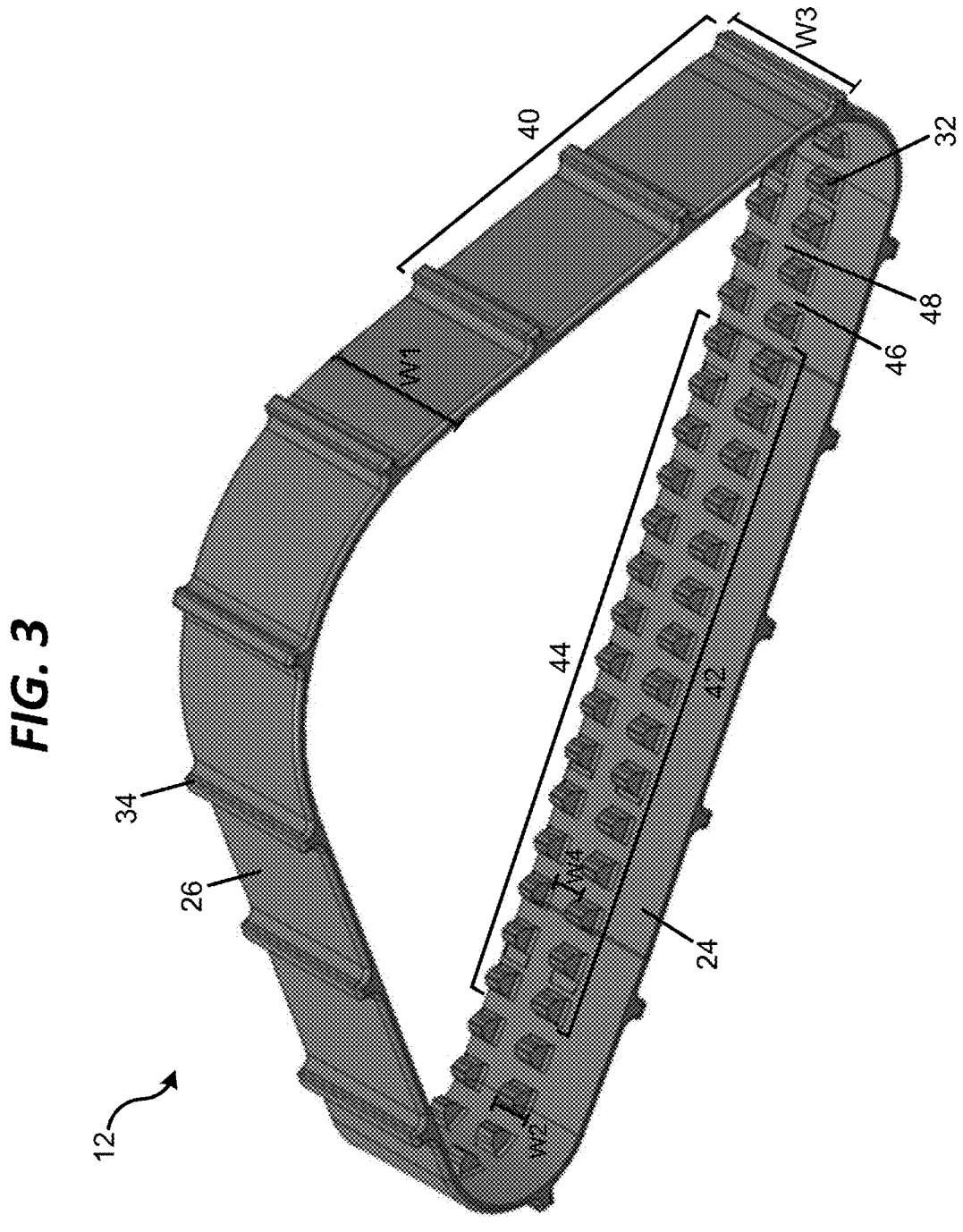
FIG. 3 illustrates a top perspective view of an endless track of an endless track assembly according to certain embodiments.

Referring to FIG. 3, the endless track 12 comprises a belt-like structure having a continuous length and a width W1. The endless track 12 includes an inside surface 24 and an outside surface 26. The endless track 12 can be formed from a flexible material that is elastic and capable of stretching and contracting. In many cases, the endless track 12 is formed of an elastomeric material such as rubber. The endless track 12 can also include belting and reinforcing fibers therein to improve durability when engaging rough terrain.

As shown in FIGS. 1-2, the endless track 12 can also be configured to have a generally triangular configuration during use. When in a triangular configuration, the endless track 12 forms three sides of a general triangle that have an equal length or an unequal length. The triangular configuration can define three curves rather than three sharp angles. The three curves include a top curve defining an apex 28 at the highest point of the endless track 12 and two lower curves 22. The portion of the endless track between the two lower curves 22 defines a base 30. The base 30 is the section of the endless track opposite the apex 28. The endless track 12 engages the drive sprocket 14 at both the apex 28 and the base 30. The base 30 is also in contact with the terrain. In other words, the drive sprocket 14 engages the endless track 12 at both the apex 28 and the base 30 such that opposite ends of a drive sprocket 14 remain engaged with the endless track 12 at all times and thus contribute to the circulation of the endless track 12.

Referring back to FIG. 3, the inside surface 24 includes a plurality of drive lugs 32 that engage with the drive sprocket 14. The outside surface 26 includes a plurality of traction lugs 34 that engage with terrain. Components of the endless track 12 can be formed from the same material or from different materials. In some cases, all components of the endless track 12 are formed from the same material. For example, all components of the endless track 12 can formed from rubber. In certain cases, certain components (e.g., the plurality of drive lugs 32 and the plurality of traction lugs 34) can include reinforcements to increase the durability and strength of those components.

Each drive lug in the plurality of drive lugs 32 extends inward from the inside surface 24 towards the center of the generally triangular configuration. Generally, each drive lug 32 can have a size and shape to engage with a drive sprocket 14. In some cases, each drive lug 32 can have the same size and shape although this is not required. As shown, each drive lug 32 can extend across the inside surface 24 for a lateral width W2.

Each traction lug in the plurality of traction lugs 34 extends outward from the outside surface 26 away from the center of the generally triangular configuration. Also, each traction lug 34 can have a size and shape to engage with a surface of a terrain and provide traction. As shown, each traction lug 34 can extend across a width W1 of the endless track 10 along the outside surface 26. For example, each traction lug 34 can have a lateral width W3 that is substantially the same as the width W1 if the endless track 12.

Also, the plurality of traction lugs 34 can define a row of traction lugs 40 that extend around an entire outer perimeter of the outside surface 26. Further, each traction lug 34 in the row 40 can be spaced apart from another traction lug 34. Here too, each traction lug 34 can have the same size and shape but this is not required.

The plurality of drive lugs 32 can define a first row of drive lugs 42 and a second row of drive lugs 44. Each the first row of drive lugs 42 and the second row of drive lugs 44 can extend around an entire inner perimeter of the inside surface 24. Also, each the first row of drive lugs 42 and the second row of drive lugs 44 can extend around an entire inner perimeter of the inside surface 24. Each drive lug 32 can be spaced from another drive lug in the same row by a gap 46. Generally, each gap 46 can have the same size although this is not required.

Further, the first row of drive lugs 42 can be laterally spaced from the second row of drive lugs 44. In some cases, the first row of drive lugs 42 can be laterally spaced from the second row of drive lugs 44 by a channel 48. The channel 48 comprises a surface between the first row of drive lugs 36 and the second row of drive lugs 38 that is free of lugs. For example, the channel 46 can be a surface that is flush with the inside surface 24. The channel 46 also extends around an entire inner perimeter of the inside surface 24. Further, the channel 46 has a lateral width W4.

Figure 4:
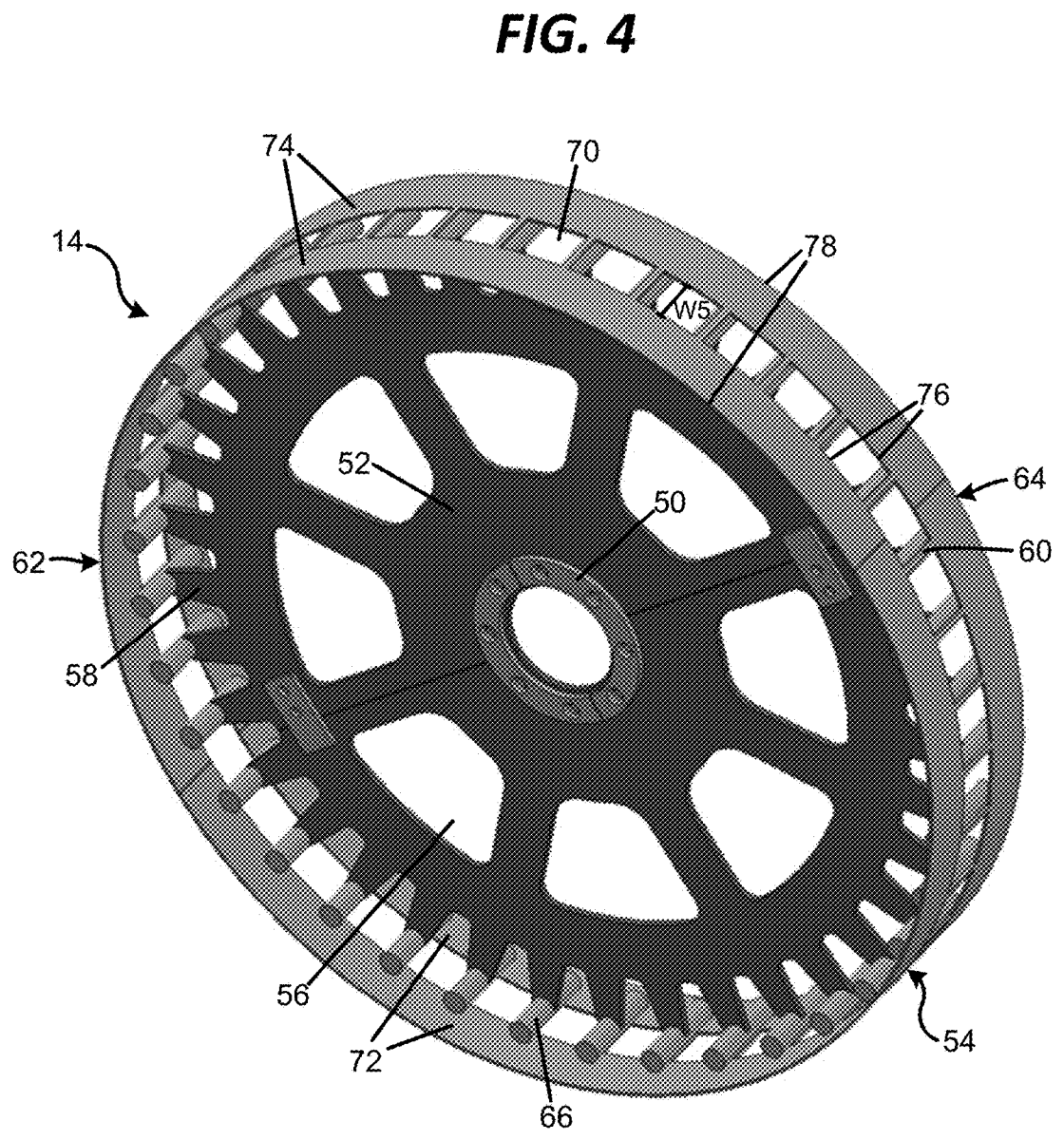

Referring to FIG. 4, the drive sprocket 14 includes a hub 50, a web 52 and an outer rim 54. The drive sprocket 14 is rotatable around the rotational axis RA. The hub 50 surrounds the rotational axis RA and has any known configuration suitable to mount to a rotating wheel drive of a vehicle (not shown). The hub 50 can also be formed of any suitable material and in some cases is formed of a metallic material.

The web 52 is positioned radially between the hub 50 and the outer rim 54. In many cases, the web 52 includes a generally circular plate including an outer circumference. The outer circumference can also define a plurality of spokes 58 that extend outward from the circular plate. The plurality of spokes 58 also extends around the entire outer circumference. Each spoke in the plurality of spokes 58 includes a tip.

The web 52 can also have features that provides strength and support to the overall drive sprocket 14. For example, the web 52 can include a plurality of cutouts 56 to help reduce the weight of the drive sprocket 14. In the illustrated embodiment, eight cutouts 56 are provided although any number can alternatively be used. Components of the web 52 can be formed from the same material or from different materials. In some cases, all components of the web 52 are formed from the same material, for example a metallic material such as aluminum. Also, in some cases all components of the web form a single integral component.

Figure 5:
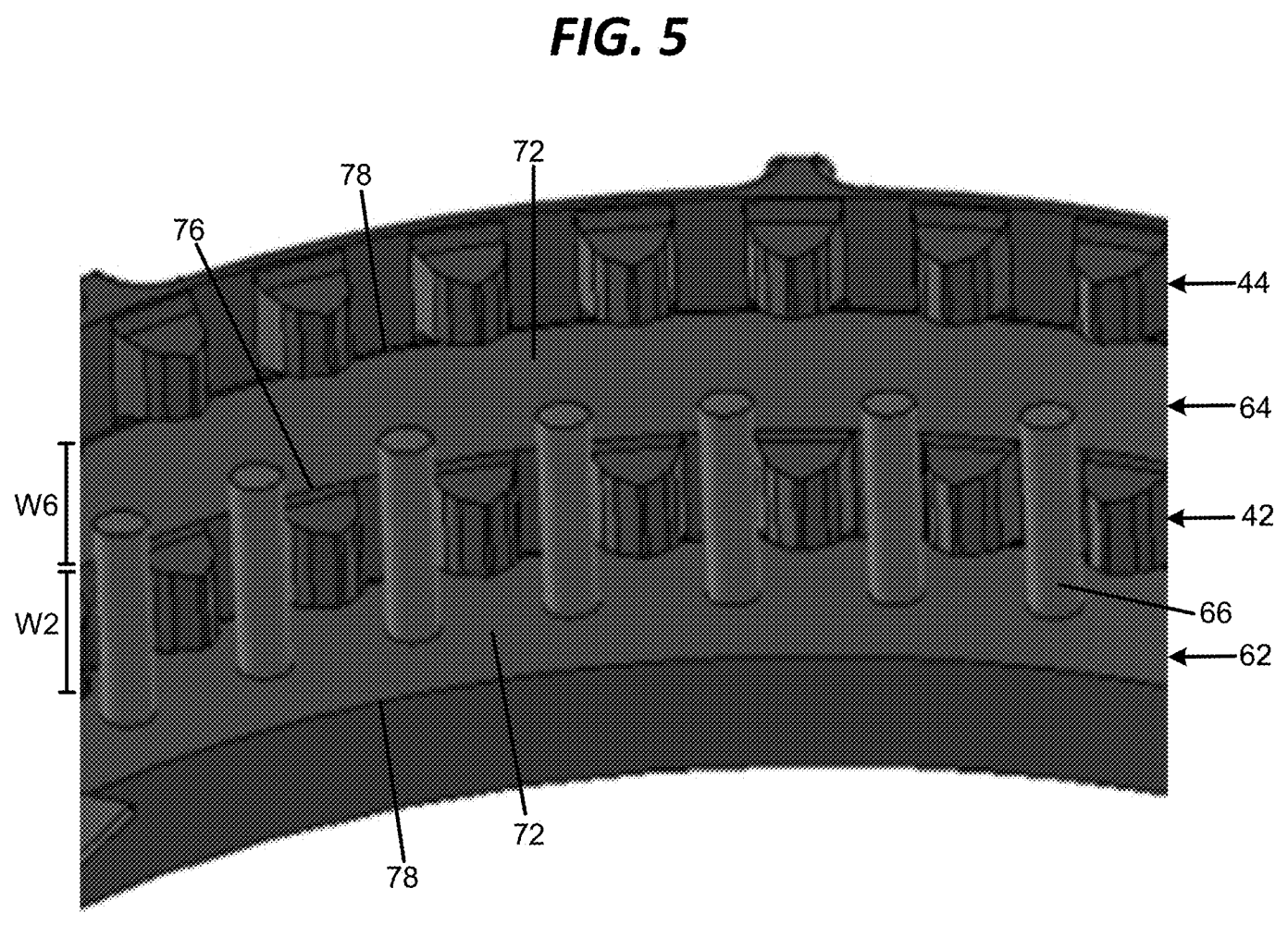

The outer rim 54 includes a generally circular rim that surrounds an outer circumference of the web 52. In many cases, the outer rim 54 includes a first annular rim 62, a second annular rim 64 and a plurality of laterally extending surfaces 60 that extend between the first annular rim 62 and the second annular rim 62. In many cases, the annular rims 62, 64 have the same size and shape. The first annular rim 60, second annular rim 62 and laterally extending surfaces 64 together form a plurality of sockets 70 that receive the drive lugs 32 on the endless track 12. Each socket 70 has a lateral width W5. Also, as shown in FIG. 5, the second annular rim 64 has a lateral width W6.

Further, each the first annular rim 62 and the second annular rim 64 includes an inside surface 72, an outside surface 74, an inner edge 76 and an outer edge 78. The inner edge 76 is generally the edge facing the plurality of sockets and the outer edge 78 is generally the edge facing away from the plurality of sockets. Each inside surface 72 faces toward the longitudinal axis LA and each outside surface 74 faces away. Each inside surface 72 engages components of the drive sprocket 14 and each outside surface 74 engages the endless track 12. A plurality of cross bearings 66 extends laterally between the first annular rim 62 and the second annular rim 64 along the laterally extending surfaces 60. Each cross bearing 66 can also define a tip of each spoke 58 of the web 52.

Generally, each cross bearing 66 can have the same size and shape. Likewise, each socket in the plurality of sockets 70 can have the same size and shape. Further, the plurality of cross bearings 66 and thus the plurality of sockets 70 are positioned about an entire circumference of the outer rim 54. Further, each socket has a lateral width W5.

Figure 6:
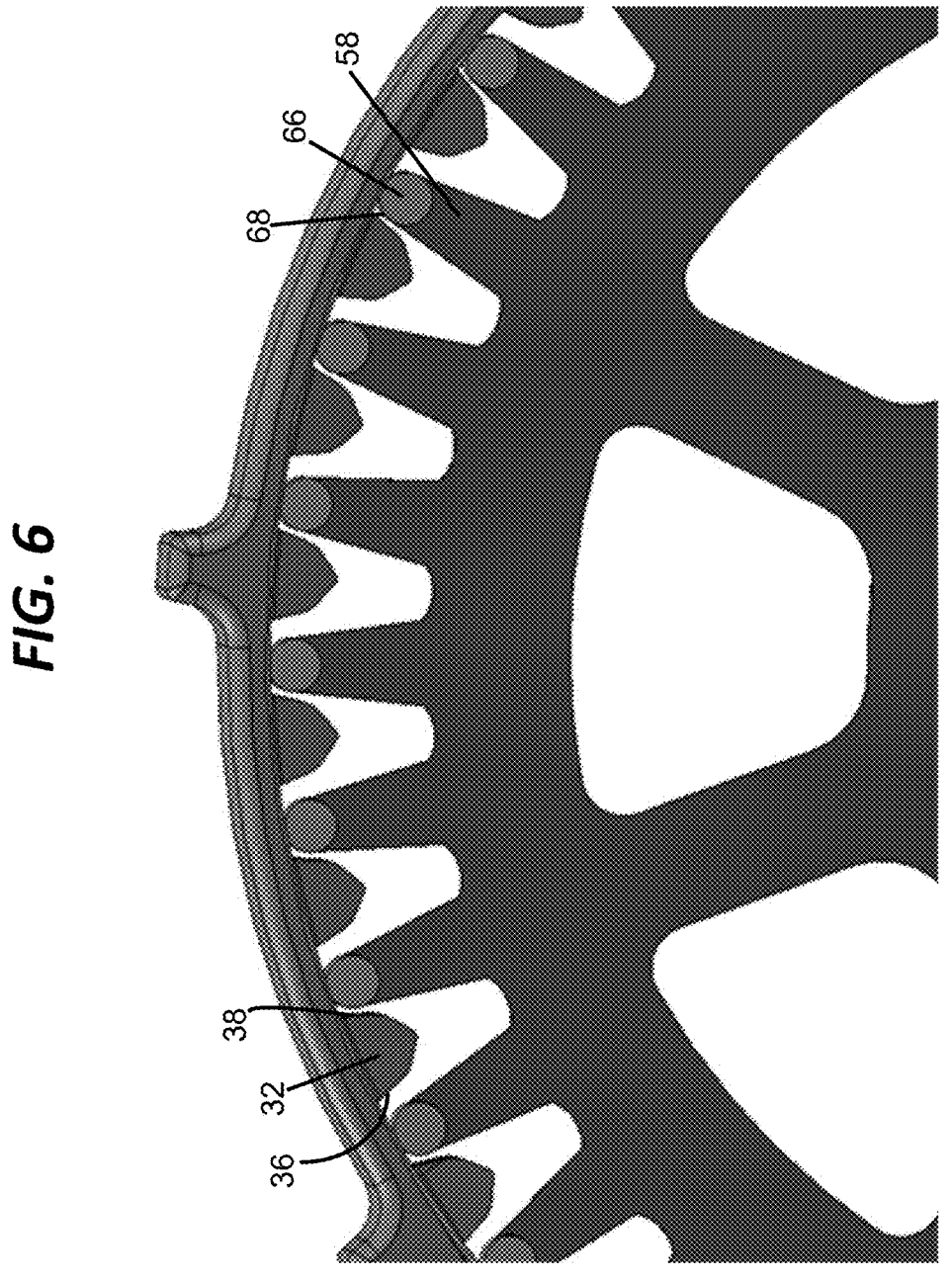
FIG. 6 illustrates a front sectional view of a drive sprocket engaged with an endless track of an endless track assembly according to certain embodiments.
Figure 7:
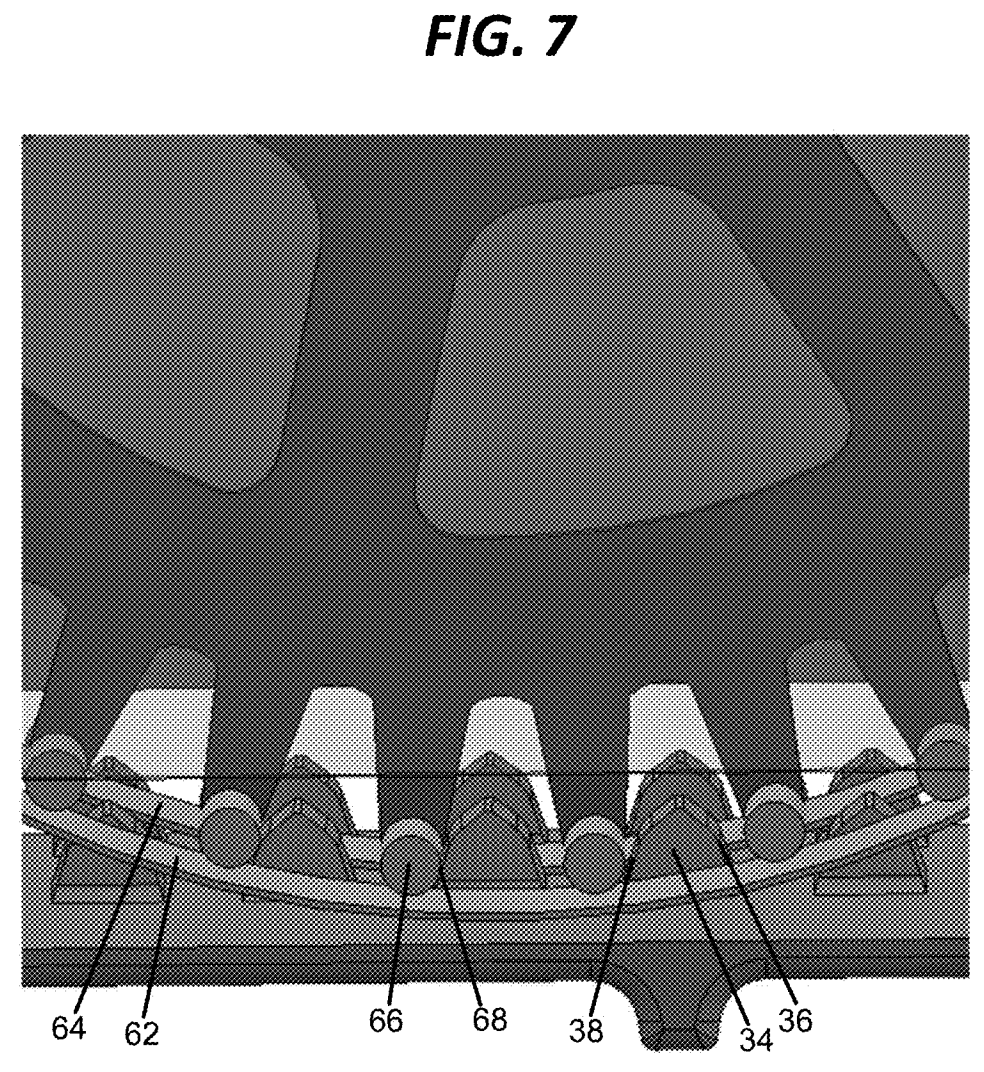

Referring to FIGS. 6-7, each drive lug 32 includes a leading edge 36 facing a direction of rotation DR and a lagging edge 38 facing way from a direction of rotation DR. As shown, each the leading edge 36 and lagging edge 38 define a generally non-linear edge. Also, as shown each cross bearing 66 is provided in contact with an inside surface 72 of each the first annular rim 62 and the second annular rim 64. Also, each cross bearing 66 includes a leading edge 68. When the drive sprocket 14 rotates in the direction of rotation DR, each leading edge 68 of each cross bearing (or of each spoke) directly engages a lagging edge 38 of each drive lug 32.

The endless drive track 12 is positioned around the outer rim 54 such that the plurality of drive lugs 32 are received by the plurality of sockets 70. As shown in FIG. 5, the second annular rim 64 can be engaged with the channel 48 of the inside surface 24 of the endless drive track 12. In certain cases, the channel 48 has a lateral width W4 and the second annular rim 64 has a lateral width W6, and W6 is less than or equal to W4. In specific cases, W6 is equal to W4 to ensure that the second annular rim 64 is snugly received by the channel 48. By holding the second annular rim 64 in the channel 48, during rotation of the drive sprocket 14, the lateral position of the endless track 12 relative to the drive sprocket 14 is maintained, thereby helping prevent separation between the endless track 12 and the drive sprocket 14. Also, each drive lug in the first row 42 has a lateral width W2 and each socket has a lateral width W5, and W2 is less than or equal to W5. In certain cases, W2 is equal to W5 to ensure that each drive lug in row 42 is snugly received by each socket 70. This helps limit the amount of rotational twisting of each lug relative to each socket 70.

Figure 8:
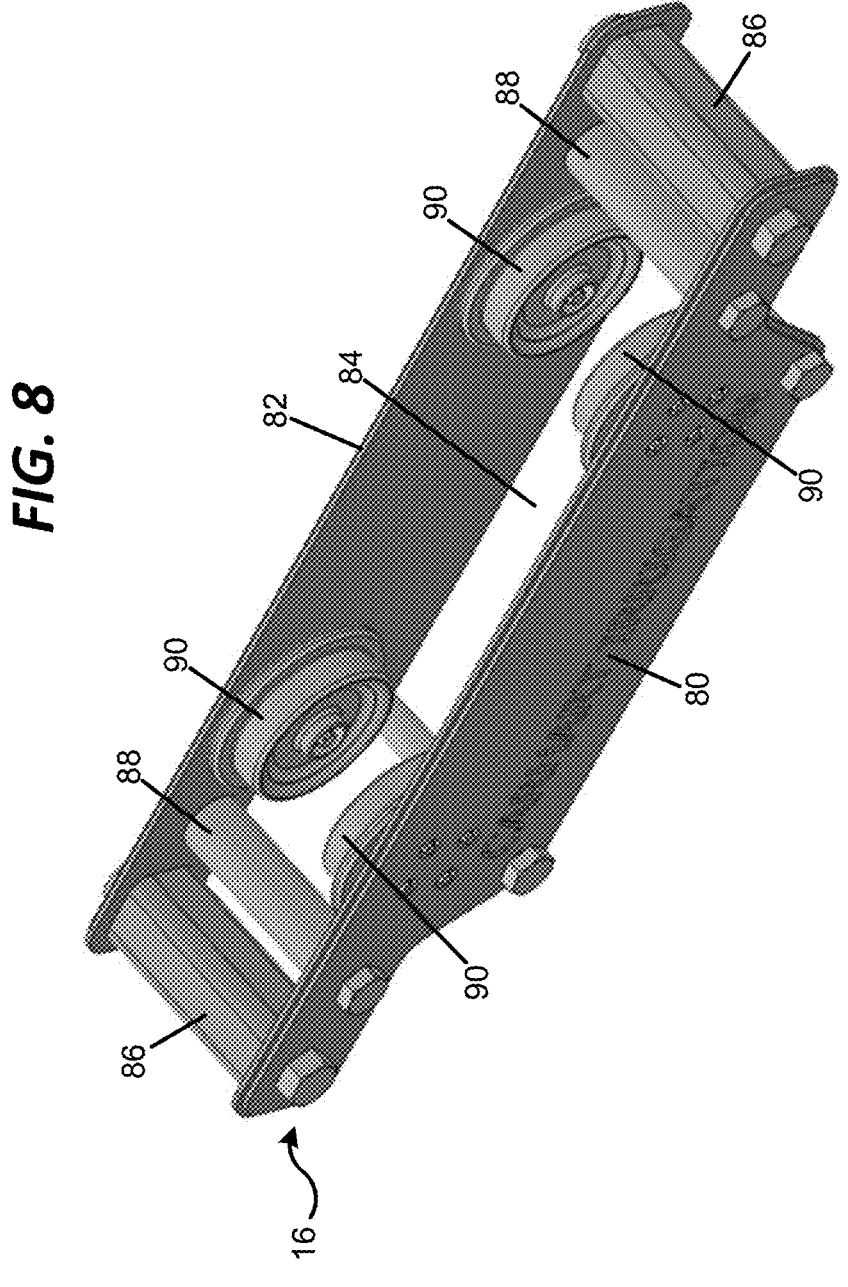
FIG. 8 illustrates a top perspective view of frame assembly of an endless track assembly according to certain embodiments.
Figure 9:
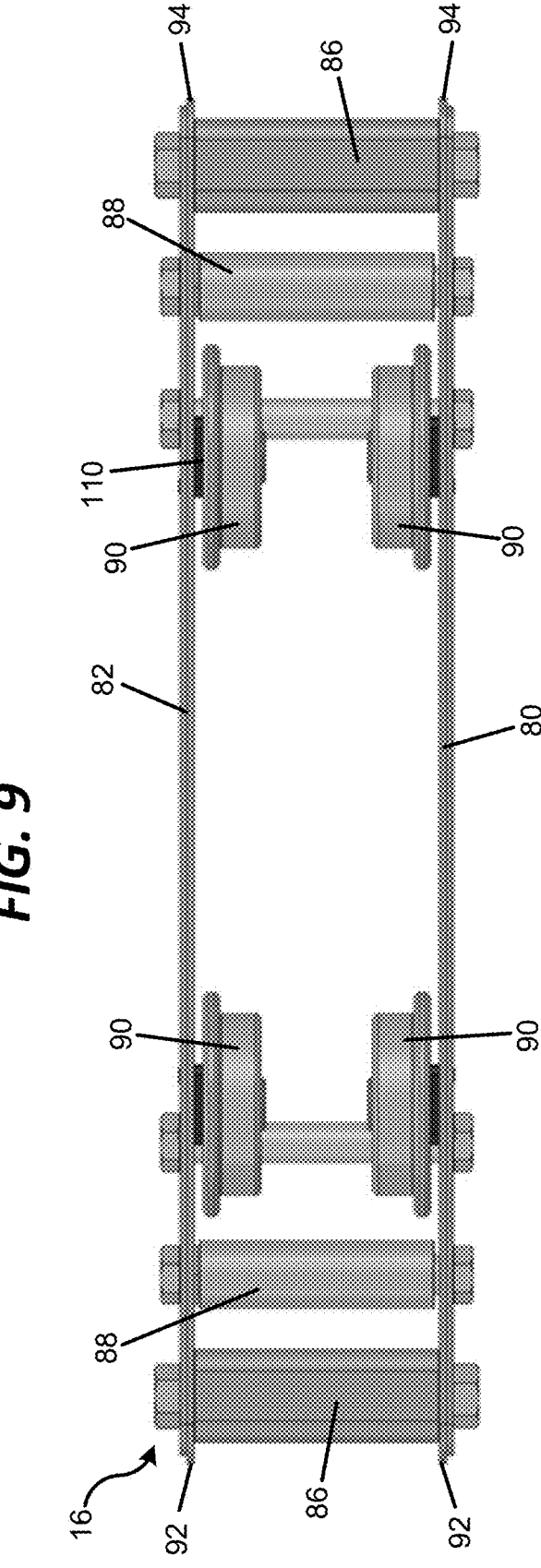
FIG. 9 illustrates a top view of frame assembly of an endless track assembly according to certain embodiments.

Referring to FIGS. 8-9, the frame assembly 16 includes a first plate 80 and a second plate 82. The first plate 80 is laterally spaced from the second plate 82 by a space 84. In many cases, the first plate 80 is held in a rigidly spaced configuration from the second plate 82. Also, the spacing between the plates 80, 82 is large enough to accommodate at least a portion of the drive sprocket 14 therebetween. The second plate 82 faces the vehicle and the first plate 80 faces away from the vehicle.

The frame assembly 16 also includes a plurality of cross struts that engage both the first plate 80 and the second plate 82. The cross struts generally add strength to the frame assembly 16 and maintain the plates 80, 82 in a rigid spaced configuration. However, certain of the cross struts can also have additional functions. In some cases, the plurality cross struts include a pair of torsion axles 86. Also, in some cases, the plurality of cross struts includes a pair of guide bushings 88. Additional pairs of cross struts can also be provided to reinforce the frame assembly 16 as needed.

Further, the frame assembly includes a plurality of guide rollers 90. In the illustrated embodiment, four guide rollers

90 are included. Specifically, the guide rollers can include a first pair of guide rollers 90 engaged with the first plate 80 and a second pair of guide rollers 90 engaged with the second plate 82.

In certain cases, the plates 80, 82 are substantially planar plates. In many cases, the plates 80, 82 have the same size and shape. Further, in many cases the plates 80, 82 have a symmetrical shape. Each plate has a leading side 92 and a lagging side 94. Each leading side 92 faces the direction of travel and each lagging side 94 faces away from the direction of travel.

The cross struts are generally positioned toward leading sides 92 and lagging sides 94 of the plates 80, 82. In certain cases, the pair of torsion axles 86 are positioned to be closer to the leading sides 92 and lagging sides 94 of the plates 80, 82 than the pair of guide bushings 88. Similarly, in certain cases, pair of torsion axles 86, 88 are positioned to be closer to the leading sides 92 and lagging sides 94 than the plurality of guide rollers 90. Also, in certain cases, the pair of guide bushings 88 are positioned to be closer to the leading sides 92 and lagging sides 94 of than the plurality of guide rollers 90. Here, the pair of guide bushings 88 are positioned between the plurality of guide rollers 90 and the pair of torsion axles 86.

Figure 10:
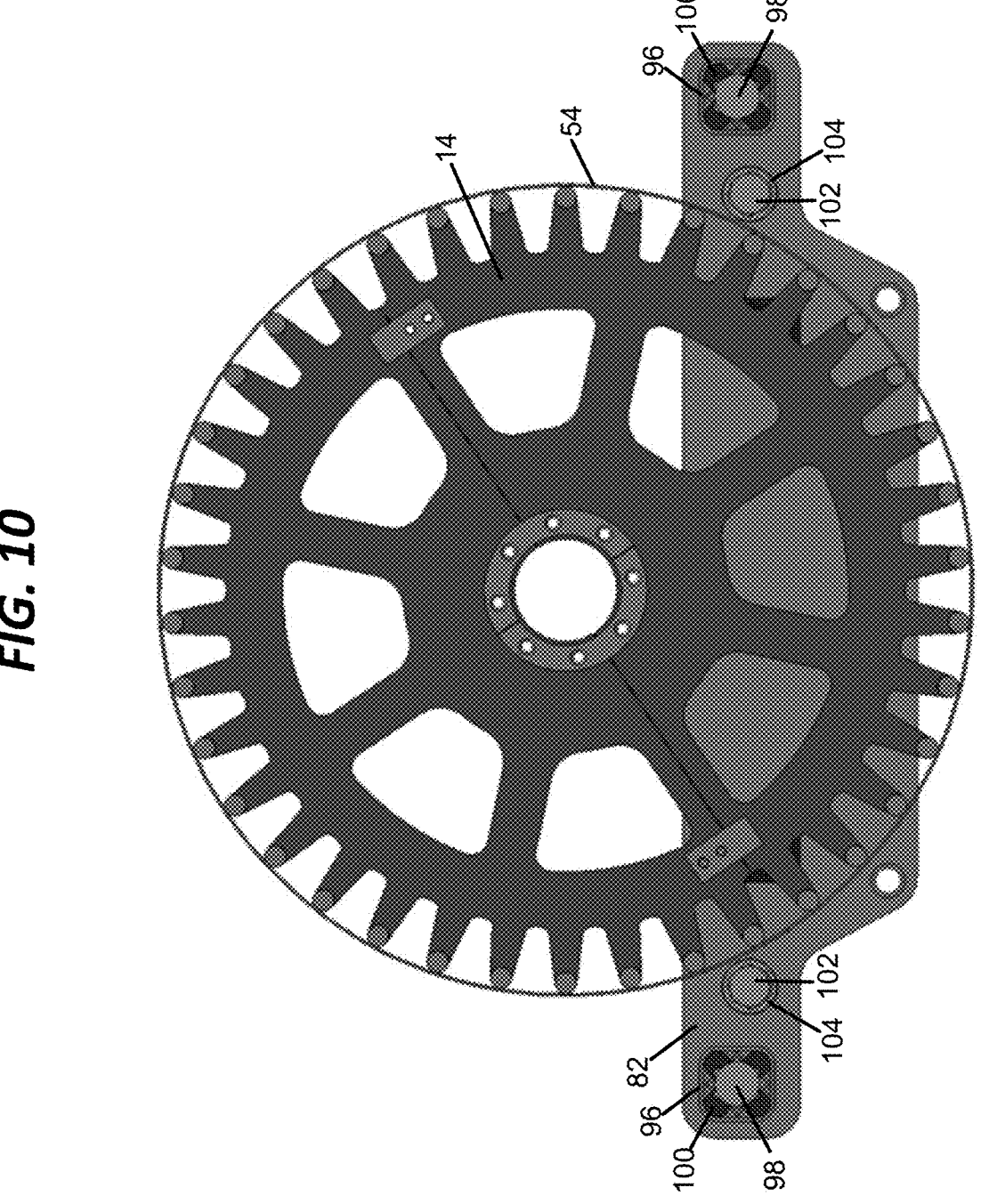
FIG. 10 illustrates a front view of a drive sprocket engaged with a plate of a frame assembly of an endless track assembly according to certain embodiments.
Figure 11:
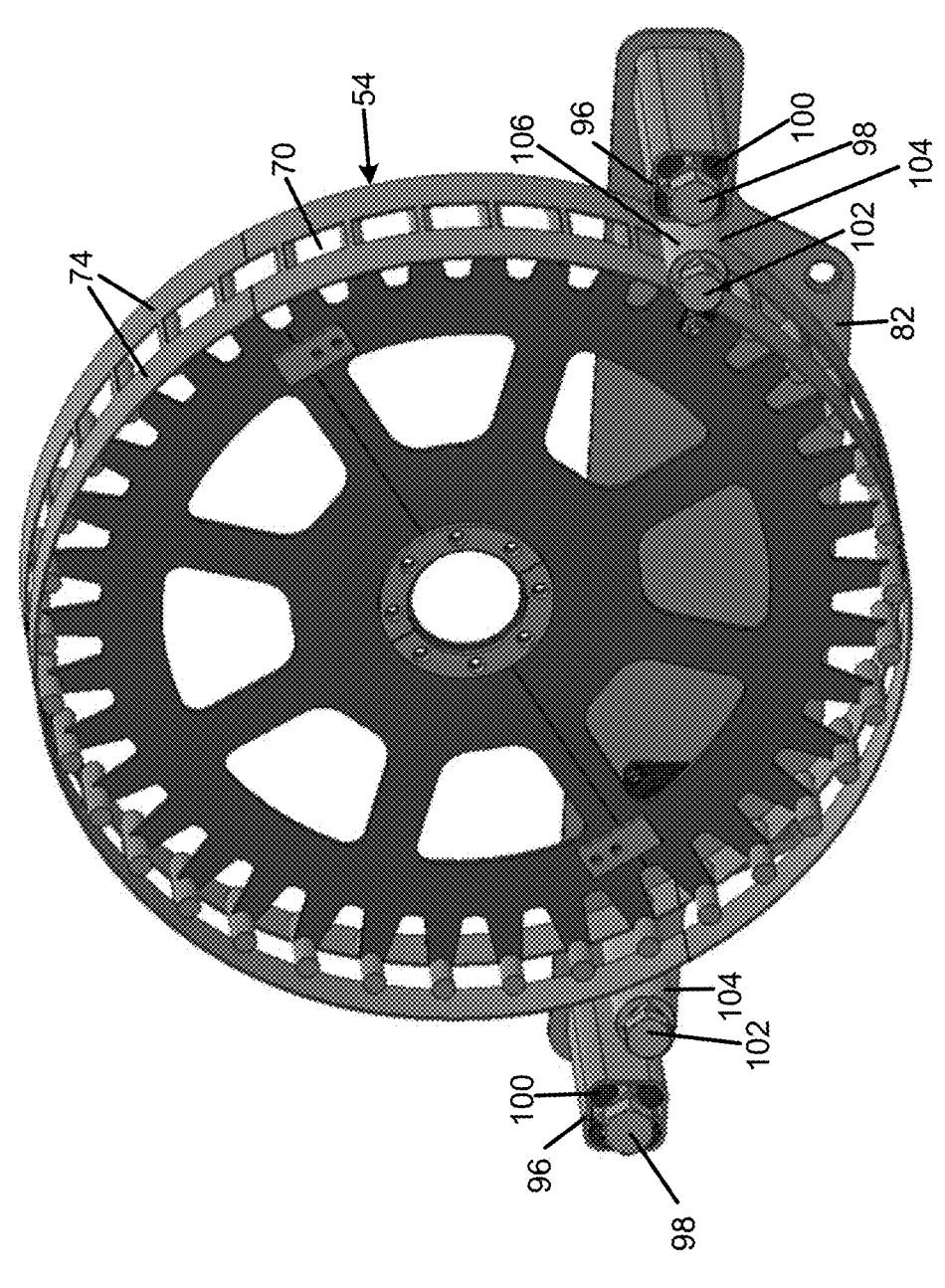
FIG. 11 illustrates a front perspective view of a drive sprocket engaged with a plate of a frame assembly of an endless track assembly according to certain embodiments.

The torsion axles 86 can be configured as any suitable torsion axle known in the art. Generally, as shown in FIGS. 10-11, each torsion axle 86 can include an outer tube 96, a center shaft 98 and a plurality of elastomeric members 100. The center shaft 98 connects to the first plate 80 at one end and to the second plate 82 at an opposite end. The center shaft 98 can function as a cross strut that rigidly connects to and separates the first plate 80 and the second plate 82. The plurality of elastomeric members 100 are provided between the center shaft 98 and the outer tube 96 and allow the outer tube 96 to pivot axially about the center shaft 98. In certain cases, the outer tube 96 is a squared shaped tube.

Each guide bushing 88 generally includes a center shaft 102 and a rotatable sleeve 104 provided about a center rotational axis RA. The rotatable sleeve 104 rotates axially about the center shaft 102. The center shaft 102 connects to the first plate 80 at one end and to the second plate 82 at an opposite end. The center shaft 102 can function as a cross strut that rigidly connects to and separates the first plate 80 and the second plate 82. The rotatable sleeve 104 can have a circular circumference that defines a sleeve guiding surface 106. The sleeve guiding surface 106 can engage with and support an outer rim 54 of the drive sprocket 14. Specifically, the sleeve guiding surface 106 can engage with and support rotation of the outside surface 74 of each the first annular rim 62 and the second annular rim 64.

Figure 12:
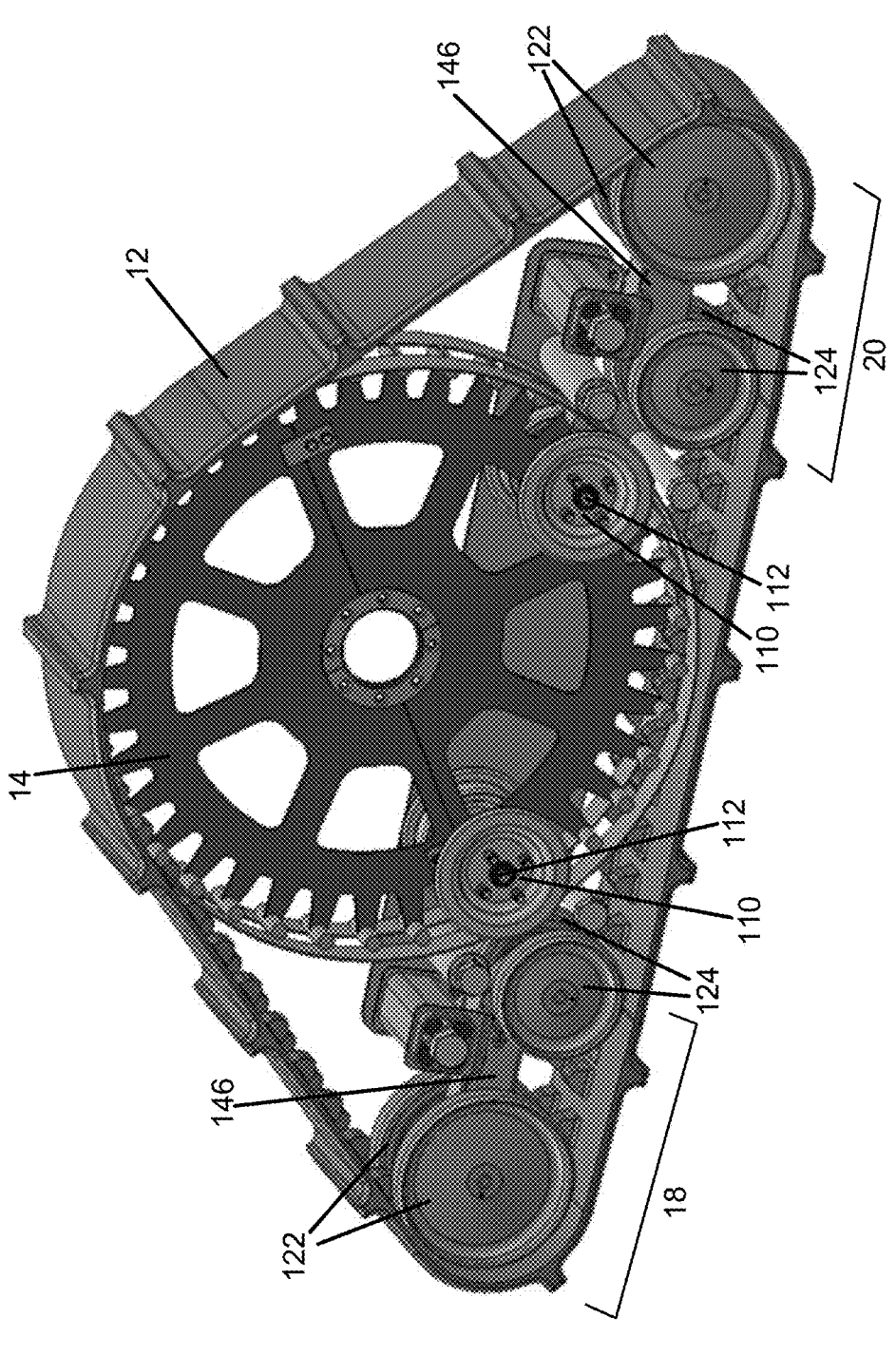
FIG. 12 illustrates a front perspective view of an endless track assembly with a plate of the frame assembly removed according to certain embodiments.
Figure 13:
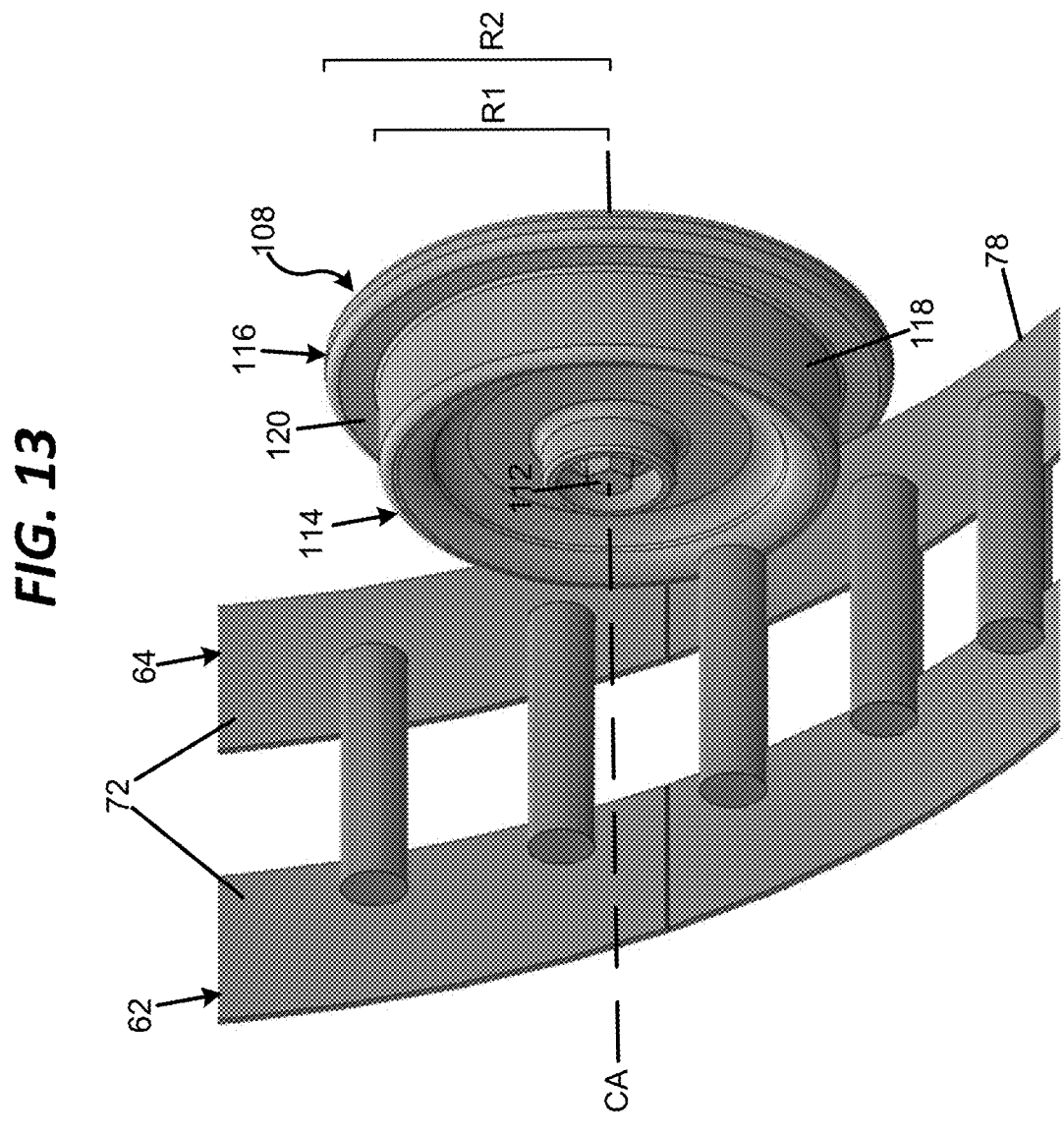
FIG. 13 illustrates a perspective sectional view of a drive sprocket engaged with a guide roller of an endless track assembly according to certain embodiments.

With reference to FIGS. 12-13, each guide roller 90 can include a flanged roller 108, a mounting portion 110 and a center bearing 112. The guide roller 90 rotates about a center rotational axis CA. The mounting portion 110 fixes to one of the plates 80, 82 through any conventional attachment mechanism such a plurality of bolts. The center bearing 112 extends through the guide roller 90 along the center rotational axis CA. The flanged roller 108 also freely rotates about the center bearing 112. The flanged roller 108 can also rotate relative to the mounting portion 110.

The flanged roller 108 includes a main portion 114 and a flanged portion 116. The flanged portion 116 generally flanges from the main portion 114. In many cases, the flanged roller 108 is a single piece such that the main portion 114 and the flanged portion 116 are integral. The main portion 114 can be positioned laterally inward the flanged portion 116, such that the main portion 114 is further from the attached plate 80 or 82 than the flanged portion 116. In other words, the flanged portion 116 can be positioned laterally outward the main portion 114, such that the flanged portion 116 is closer to the attached plate 80 or 82 than the main portion 114.

Further, the main portion 114 can be positioned radially inward the flanged portion 116, such that the main portion 114 is closer to the center rotational axis CA than the flanged portion 116. In certain cases, the main portion 114 can have a first radius R1 extending from the center rotational axis CA while the flanged portion has a second radius R2 also extending from the center rotational axis CA. The second radius R2 is larger than the first radius R1, due to the flanged portion 116 flanging off the main portion 114.

The main portion 114 also includes an outer rim 118. The outer rim 118 defines an outer circumference of the main portion 114. The outer rim 118 is also a surface of the main portion 14 that is furthest radially from the center rotational axis CA. The outer rim 118 also extends laterally inward from the flanged portion 116 and towards the drive sprocket 14. The outer rim 118 engages with the outer rim 54 of the drive sprocket 14.

The flanged portion 116 includes a guiding surface 120. The guiding surface 120 extends radially outward from the main portion 114. In many cases, the outer rim 118 of the main portion 114 is perpendicular to the guiding surface 120 of the flanged portion 120. The guiding surface 120 engages with the outer rim 54 of the drive sprocket 14.

Together, the outer rim 118 and the guiding surface 120 engage with and support either the first annular rim 62 or the second annular rim 64. Specifically, the outer rim 118 engages with an inside surface 72 of either the first annular rim 62 or the second annular rim 64 while the guiding surface 120 engages with an outer edge 78 of the same rim. In some cases, the outer rim 118 can be in direct contact with or closely spaced from the inside surface 72. Likewise, the guiding surface 120 can be in direct contact with or closely spaced from the outer edge 78, although this is not required. As the flanged roller 108 rotates around the center bearing 112, surfaces 118, 120 also rotate. Likewise, when the first annular rim 62 and the second annular rim 64 rotate in a direction, the inside surfaces 72 and outer edges 78 also rotate in the same direction.

The plurality of guide rollers 90 work together to help maintain the drive sprocket 14 in position so that outer rim 54 does not shift laterally or radially. Therefore, if the endless track 12 is removed or loses tension around the drive sprocket 14, the guide rollers 90 help maintain the drive sprocket 14 in position.

With reference to FIG. 12, the endless track assembly 10 further includes a first idler wheel assembly 18 and a second idler wheel assembly 20. In the illustrated embodiment, the first idler wheel assembly 18 is a leading wheel assembly and the second idler wheel assembly 20 is a lagging assembly. Each idler wheel assembly includes an independent suspension system.

Each the first idler wheel assembly 18 and the second idler wheel assembly 20 includes a pair of corner wheels 122 and a pair of non-corner wheels 124. Further, the pair of corner wheels 122 are longitudinally separated from the pair of non-corner wheels 124. The pair of corner wheels 124 are positioned to be further from the drive sprocket 14 than the pair of non-corner pair of wheels 122. A support arm 146 operably connects the corner pair of wheels 124 to the non-corner pair of wheels 124.

Figure 16:
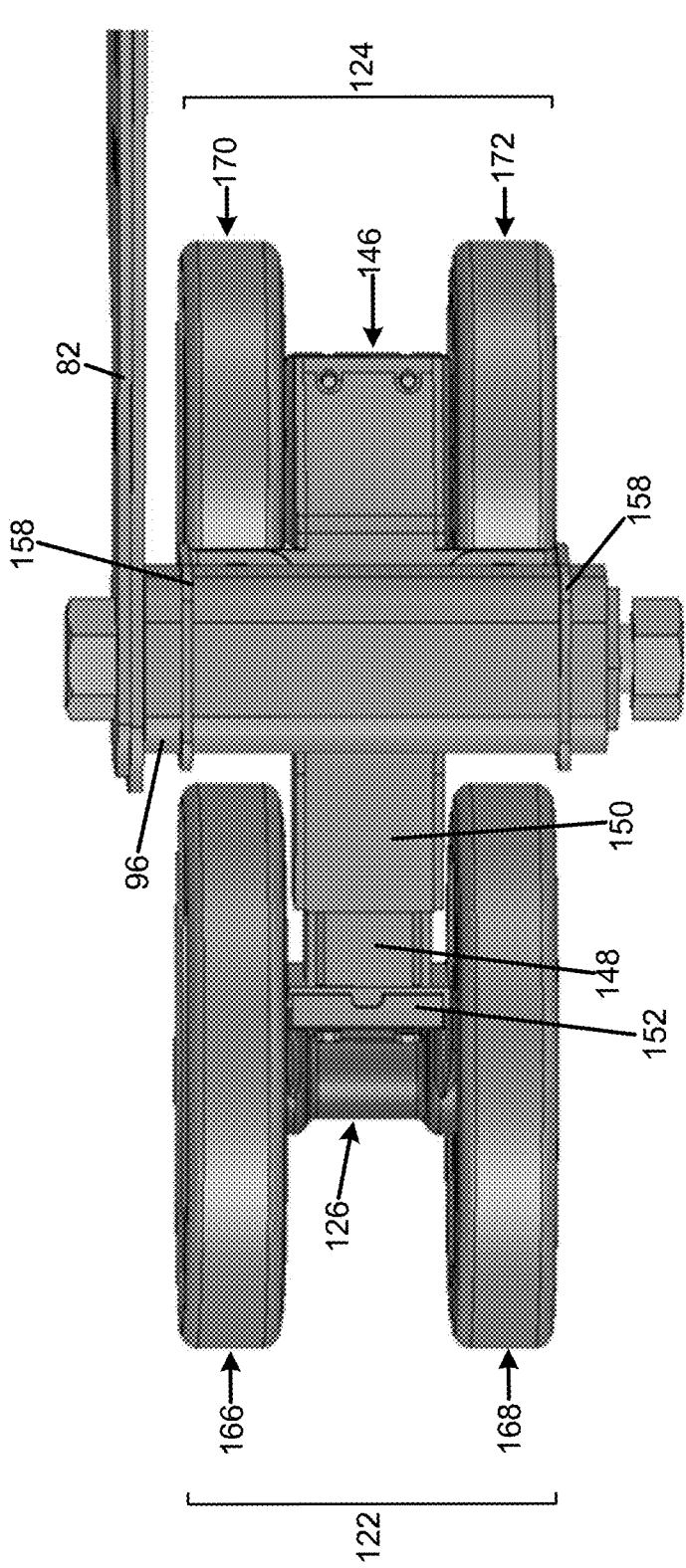
FIG. 16 illustrates a top sectional view of a leading idler wheel assembly engaged with a plate of a frame assembly of an endless track assembly according to certain embodiments.
Figures 18A, 18B:
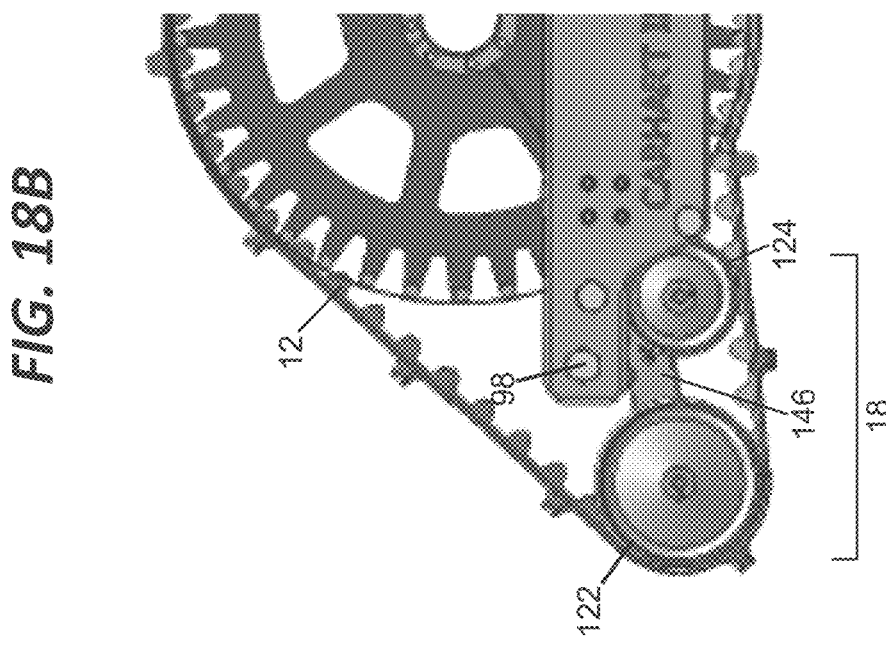
FIG. 18A illustrates a front sectional view of a leading idler wheel assembly in a first engagement position with an endless track and a frame assembly of an endless track assembly according to certain embodiments.
FIG. 18B illustrates a front sectional view of a leading idler wheel assembly in a second engagement position with an endless track and a frame assembly of an endless track assembly according to certain embodiments.
Figures 19A, 19B:
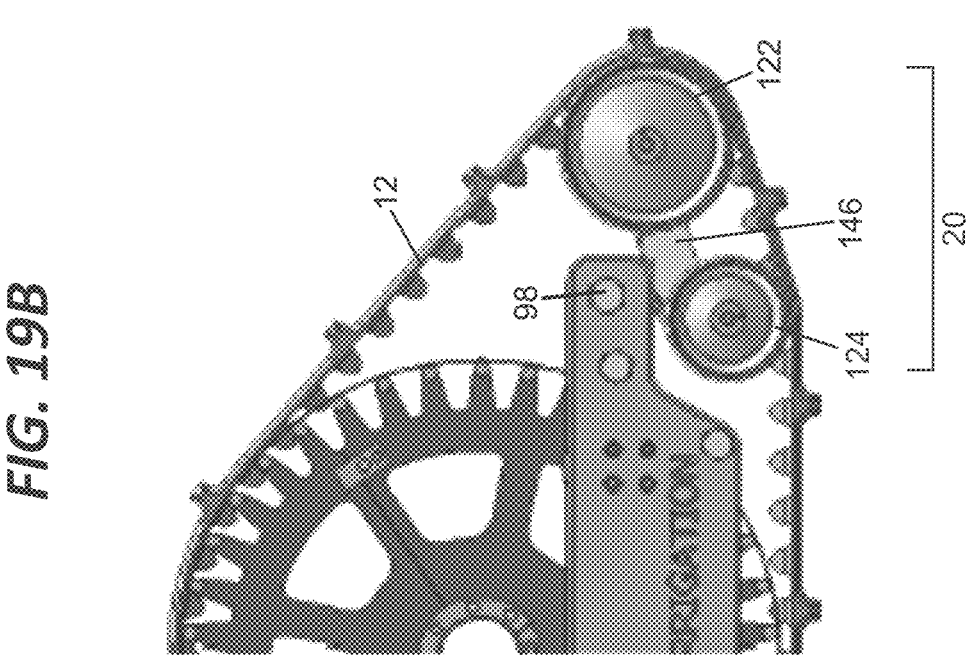
FIG. 19A illustrates a front sectional view of a lagging idler wheel assembly in a first engagement position with an endless track and a frame assembly of an endless track assembly according to certain embodiments.
FIG. 19B illustrates a front sectional view of a lagging idler wheel assembly in a second engagement position with an endless track and a frame assembly of an endless track assembly according to certain embodiments.

As best shown in FIG. 16, each pair of corner wheels 122 includes a first corner wheel 166 and a second corner wheel

168. The second corner wheel 168 faces the vehicle and the first corner wheel 166 faces away from the vehicle. The first corner wheel 166 is also coaxial with the second corner wheel 168 and is axially separated to provide a drive lug receiving passage therebetween. Also, each pair of non-corner wheels 124 includes a first non-corner wheel 170 and a second non-corner wheel 172. The second non-corner wheel 172 faces the vehicle and the first non-corner wheel 170 faces away from the vehicle. The first non-corner wheel 170 is also coaxial with the second non-corner wheel 172 and is axially separated to provide a drive lug receiving passage therebetween.

Figure 14:
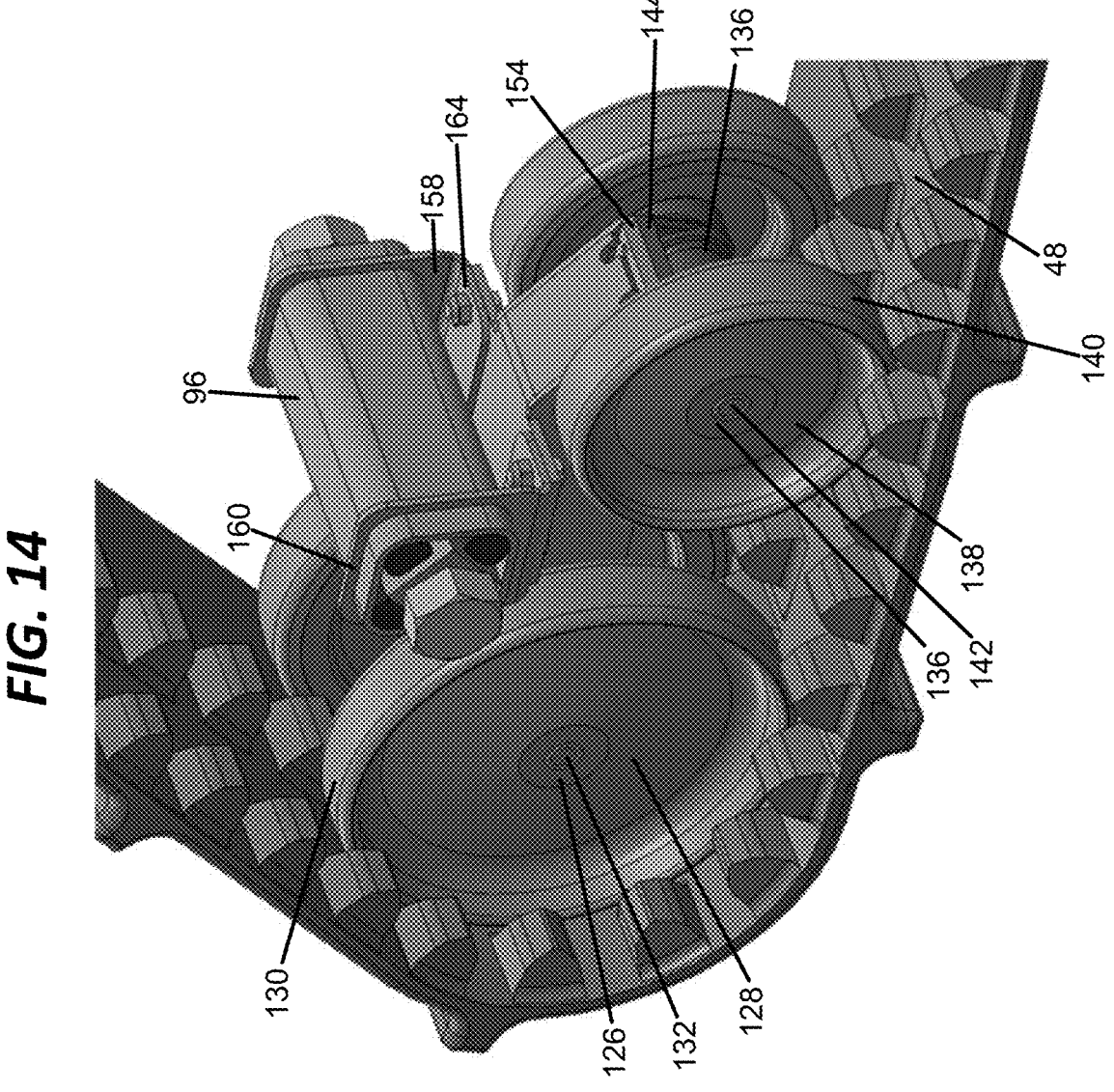
FIG. 14 illustrates a perspective sectional view of a leading idler wheel assembly engaged with an endless track of an endless track assembly according to certain embodiments.
Figure 15:
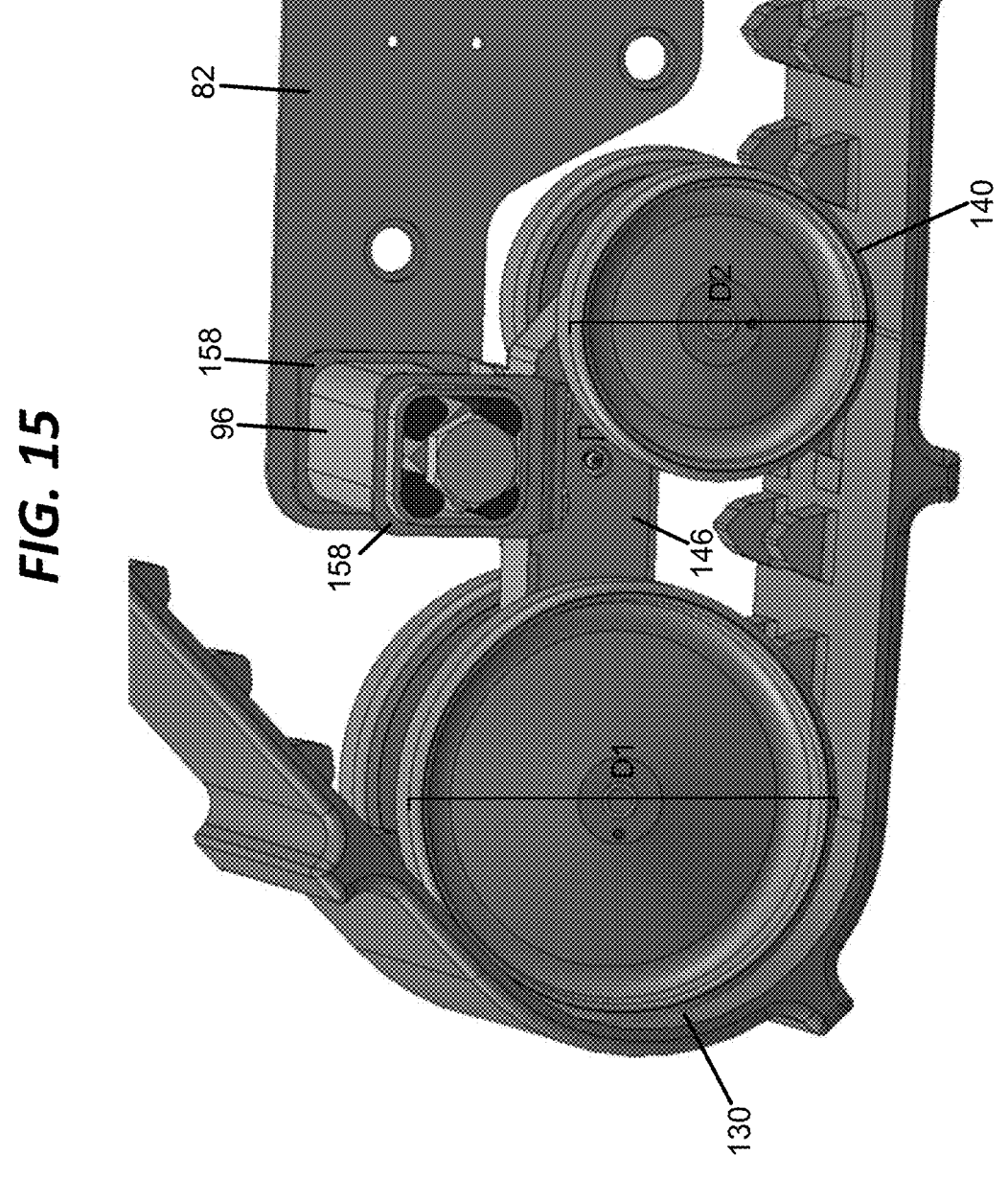
FIG. 15 illustrates a perspective sectional view of a leading idler wheel assembly engaged with an endless track and plate of a frame assembly of an endless track assembly according to certain embodiments.

Referring to FIGS. 14-15, each corner wheel 122 includes a wheel axle 126, a main portion 128, an outer rim 130 and a center bearing 132. Further, each non-corner wheel 124 can include a wheel axle 136, a main portion 138, an outer rim 140 and a center bearing 142.

Further, the corner wheel 122 has a diameter D1, which is measured from the outer rim 130. Also, the non-corner wheel 124 has a diameter D2, which is also measured from the outer rim 140. In some cases, all four corner wheels 122 in the assembly 10 have the same diameter D1 and all four non-corner wheels 124 have the same diameter D2. Further, in some cases, D1 is greater than D2.

The outer rim 130 defines the outside surface of the corner wheel 122 that engages with the endless drive track 12. The outer rim 140 defines the outside surface of the non-corner wheel 124 that engages with the endless drive track 12. As shown in FIG. 14, the outer rims 130, 140 ride inside the channel 48.

Figure 17:
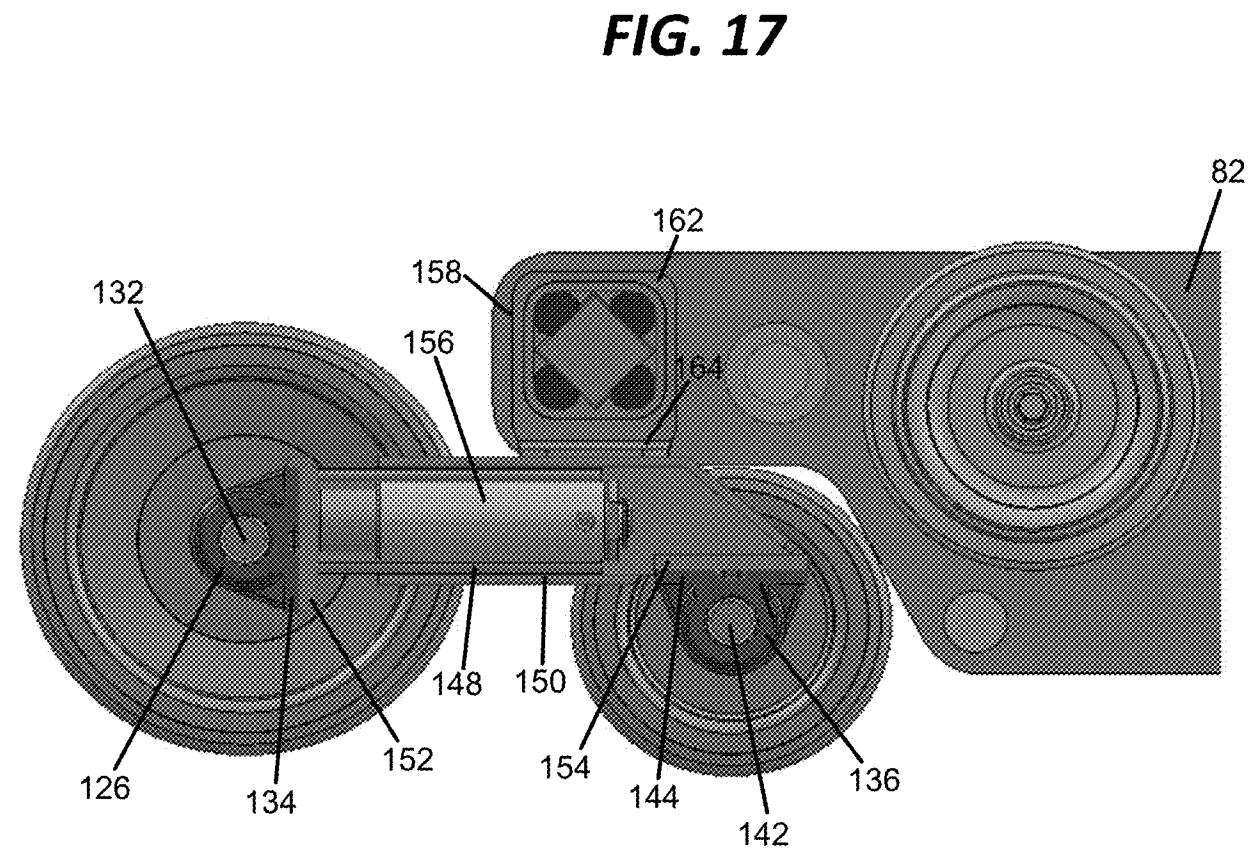

With reference to FIGS. 16-17, each idler wheel assembly includes a support arm 146. The support arm 146 can be configured as a telescoping support arm including an inner arm tube 148 and an outer arm tube 150. The inner arm tube 148 is slidably received by the outer arm tube 150. The telescoping support arm 146 can have a desired tubular shape such that the inner arm tube 148 is slidable received by the outer arm tube 150. In some cases, the support arm 146, including inner arm tube 148 and outer arm tube 150, have a square or rectangular shape.

The support arm 146 is operably connected to the pair of corner wheels 122, the pair of non-corner wheels 124 and to the torsion axle 86. In specific cases, as shown in FIG. 17, the inner arm tube 148 includes a mounting surface 152 that generally faces the wheel axle 126 of the corner wheel 122. The wheel axle 126 can include a mounting surface 134 that mounts to the mounting surface 152 to connect the corner wheel 122 to the support arm 146. The outer arm tube 150 also includes a mounting surface 154 that generally faces the wheel axle 136 of the non-corner wheel 124. The wheel axle 136 can include a mounting surface 144 that mounts to the mounting surface 152 to connect the corner wheel 122 to the support arm 146.

The outer arm tube 150 is rigidly connected to the torsion axle 86 via a mounting bracket 158. The mounting bracket 158 can include a single bracket or two brackets as best shown in FIGS. 14 and 16. Each mounting bracket 158 has a portion 160 that surrounds and fixes to an outside tube 96 of the torsion axle 86. Each mounting bracket 158 also has a mounting surface 164 that mounts to the outer arm 150.

The support arm 146 is therefore connected to the torsion axle 86 and allows the entire wheel assembly to pivot with the torsion axle. Such pivoting allows each idler wheel assembly to independently pivot when moving over terrain, thus providing a smoother ride and less stress to the remaining components of the endless drive track assembly 10.

Further, as shown in FIG. 17, a biasing mechanism 156 is provided inside the support arm 146 to bias the wheel bearing 126 of the corner wheel 122 outward in a direction away from the support arm 146. In certain cases, the inner arm tube 148 houses biasing mechanism 156 that applies biasing force on the mounting bracket 152, which in turn applies force on the mounting surface 134 of the wheel axle 126 and pushes it outward. The biasing mechanism 156 can be any suitable mechanism known in the art such as a spring or a gas cylinder. Such biasing allows the corner wheel 122 to push against the endless track 12 and keep it tout. The biasing also allows the corner wheel 122 to move inward against the biasing pressure as necessary when encountering different terrain. This helps cushion or dampen collisions or traversals over rough terrain.

During operation, when the leading wheel assembly 18 and lagging wheel assembly move over terrain, each corner wheel 122 moves relative to a corresponding non-corner wheel 124. During normal operation, when the leading wheel assembly 18 and lagging wheel assembly move over terrain, the corner wheel 122 biases outward from the non-corner wheel 124. However, when obstacles are encountered, each corner wheel 122 moves relative to a corresponding non-corner wheel 124. For example, should a corner wheel 122 of the leading wheel assembly 18 encounter a rock or other obstacle, it can move against the biasing mechanism and towards the non-corner wheel 124 to help move the assembly over the obstacle. Once the obstacle is past, the corner wheel 122 would then resume its normal position in biasing outward from the non-corner wheel 124. Such relative movement of the wheels 122, 124 helps provide a smoother ride over terrain.

Further, as shown in FIGS. 17A-17B and FIGS. 18A-18B, each support arm 146 is rigidly connected to each torsion axles 86 and to each of the wheel bearings 126, 136. This allows for each support arm 146 and thus wheels 122, 124 to pivot via the torsion axle 86. As the wheels 122, 124 move over terrain, they are allowed to pivot, which also helps provide a smoother ride.

While some preferred embodiments of the invention have been described, it should be understood that various changes, adaptations and modifications may be made therein without departing from the spirit of the invention and the scope of the appended claims.

The invention claimed is:

1. An endless track assembly configured to mount to a rotating wheel drive of a vehicle, the endless track assembly having a central longitudinal plane and a lateral extent and comprising:

a multi-component frame;

a drive sprocket rotatable about a drive sprocket center axis, the drive sprocket adapted to be mounted to the rotating wheel drive of a vehicle, the drive sprocket having an outer radial surface and an inside surface opposite to the outer radial surface;

idler wheels each rotatable about a central axis of the idler wheel relative to the frame;

an endless track arranged in a generally triangular configuration around the frame, outside surface of the drive sprocket, and the idler wheels by being routed over a top portion of the drive sprocket to form an apex and also routed around the idler wheels to form a base that is wider than the apex, the endless track engaged with the drive sprocket at the apex and driven by rotation of the drive sprocket to circulate the endless track about the frame, drive sprocket, and idler wheels in a generally triangular path;

a plurality of guide rollers each rotatably mounted to the frame and supporting the drive sprocket, each guide roller having a laterally inward portion and a laterally outward portion, the laterally inward portion closer to the central longitudinal plane than the laterally outward portion, the laterally inward portion having a radius smaller than the radius of the laterally outward portion, the laterally outward portion being journaled for rotation against or closely spaced from a laterally outward edge of the drive sprocket to provide a guide or a limit on the lateral movement of the drive sprocket, the laterally inward portion being journaled for rotation against or closely spaced from the inside surface, opposite to the outer radial surface, of the drive sprocket and restricting movement of the drive sprocket in a radial direction relative to the frame; and further comprising a plurality of guide bushings each rotatably mounted to the frame and supporting the drive sprocket, each guide bushing configured to engage an entire lateral extent of the outer radial surface of the drive sprocket and to rotate with the rotation of the drive sprocket.

2. The endless track assembly of claim 1, wherein the outer radial surface of the drive sprocket engages with the endless track at the apex and at the base of the generally triangular configuration of the endless track.

3. The endless track assembly of claim 2, wherein the outer radial surface of the drive sprocket engages with the endless track at the base of the generally triangular configuration of the endless track at a location on the base between the idler wheels.

4. The endless track assembly of claim 1, wherein the outer radial surface of the drive sprocket includes a series of circumferentially-spaced lug receiving sockets each for receiving a lug on the inner surface of the endless drive track.

5. The endless track assembly of claim 1, wherein the drive sprocket includes two, laterally spaced, annular rims, each rim having a laterally outward edge, an outer radial surface, and an inner surface opposite the outer radial surface, the laterally outward edges of the rims forming the laterally outward edges of the drive sprocket, the outer radial surfaces of the rims forming the outer radial surface of the drive sprocket, the inner surfaces of the rims forming the inside surface of the drive sprocket, opposite to the outer radial surface of the drive sprocket.

6. The endless track assembly of claim 1, wherein the multicomponent frame includes an inner plate and an outer plate rigidly laterally separated and rigidly connected by a plurality of cross-struts, each guide bushing including one of the plurality of cross struts.

7. The endless track assembly of claim 1, wherein the idler wheels are part of two idler wheel assemblies, each idler wheel assembly independently suspended from the frame to permit independent movement of the idler wheels on one of the two idler wheel assemblies from the idler wheels on the other of the two idler wheel assemblies.

8. The endless track assembly of claim 7, wherein each idler wheel assembly is pivotally mounted to the frame providing pivotal movement of one of the two idler wheel assemblies independent from pivotal movement of the other of the two idler wheel assemblies.

9. The endless track assembly of claim 7, wherein the each idler wheel assembly is comprised of two idler wheels, the endless track being routed around one of the two idler wheels in form the base, the one of the two idler wheels forming a corner of the base, the other one of the two idler wheels forming the base and being separated a distance along the base from the one of the two idler wheels by a spring, the spring biasing the one of the two idler wheels away from the other one of the two idler wheels, the spring biasing indirectly tensioning the endless track via the bias on the one of the two idler wheels, the tensioning of the endless track helping maintain the triangular configuration around the frame, outside surface of the drive sprocket, and the idler wheels.

* * * * *